United States Patent [19]

Weisser, Jr.

[11] Patent Number: 5,438,568

[45] Date of Patent: Aug. 1, 1995

[54] MEDIATION OF OPEN ADVANCED INTELLIGENT NETWORK INTERFACE FOR PUBLIC SWITCHED TELEPHONE NETWORK

[75] Inventor: Frank J. Weisser, Jr., Atlanta, Ga.

[73] Assignee: BellSouth Corporation, Atlanta, Ga.

[21] Appl. No.: 300,981

[22] Filed: Sep. 6, 1994

Related U.S. Application Data

[63] Continuation of Ser. No. 83,984, Jun. 28, 1993, abandoned.

[51] Int. Cl.$^6$ .............................................. H04L 12/56
[52] U.S. Cl. ........................................ 370/60; 379/96
[58] Field of Search .................. 370/60, 94.1, 110.1; 379/201, 113, 207, 211, 67, 93, 94, 96, 142, 265, 89, 210, 214, 212, 112, 221, 242, 230

[56] References Cited

U.S. PATENT DOCUMENTS

| | | | |
|---|---|---|---|
| 4,611,094 | 9/1986 | Asmuth et al. | 379/201 |
| 4,748,658 | 5/1988 | Gopal et al. | 379/221 |
| 4,756,019 | 7/1988 | Szybicki | 379/112 |
| 4,768,221 | 8/1988 | Green et al. | 379/67 |
| 4,943,996 | 7/1990 | Baker, Jr. et al. | 379/96 |
| 4,979,118 | 12/1990 | Kheradpir | 364/436 |
| 4,993,024 | 2/1991 | Quinquis et al. | 370/94.1 |
| 5,001,710 | 3/1991 | Gawrys et al. | 379/93 |
| 5,027,384 | 6/1991 | Morganstein | 379/67 |
| 5,042,064 | 8/1991 | Chung et al. | 379/113 |
| 5,109,405 | 4/1992 | Morganstein | 379/89 |
| 5,142,570 | 8/1992 | Chaudhary et al. | 379/221 |
| 5,212,727 | 5/1993 | Ramkumar | 379/221 |
| 5,231,631 | 7/1993 | Buhrke et al. | 370/60 |
| 5,251,255 | 10/1993 | Epley | 379/242 |
| 5,282,244 | 1/1994 | Fuller et al. | 379/230 |
| 5,295,183 | 3/1994 | Langlois et al. | 379/113 |

FOREIGN PATENT DOCUMENTS 0340665  8/1989  European Pat. Off. .

OTHER PUBLICATIONS

Calauitti, "Issues and Some Solutions for Internetwork CCS7 Implementation", Proceedings of the National Communications Forum, vol. 45, pp. 220–222, Sep. 1990.

Regnier et al., "Personal Communication Services-the New POTS", IEEE Global Telecommunications Conference and Exhibition-Globecom '90, vol. 1, pp. 420–426, 2 Dec. 1990.

Hall et al., "The AT&T Service Circuit Node: A New Element for Providing Intelligent Network Services", AT&T Technical Journal, vol. 70, No. 3/4, pp. 72–84, Summer 1991.

El-Toumi et al., "Interconnecting SS7 Signaling Networks", IEEE International Conference on Communications-ICC '90, vol. 2, pp. 589–593, 15 Apr. 1990.

Enabling CS-1 SSF-SCF capabilities Across Network Borders-Royal PTT Nederland NV-Submission to ITV.

*Primary Examiner*—Douglas W. Olms
*Assistant Examiner*—Dang Ton
*Attorney, Agent, or Firm*—Jones & Askew

[57] ABSTRACT

A method of mediating message traffic across interfaces open to third parties in an Advanced Intelligent Network for a switched telephone system is disclosed. Network utilization is monitored by maintaining message counts at the open interfaces and rejecting messages or terminating access via the interface when an excessive rate of traffic is detected. Access to data bases stored in service control points is used to determine if the sender identified in the contents of the message is the same as the entity authorized to use the physical port upon which the message was received. Also, customer records in the service control point are tested to determine if the sender of the message is authorized to affect the call progress of an affected customer directory number identified in the message. Upon termination of the message traffic across a port, a default application is activated so that other network elements do not have to rely on timeouts to continue processing of calls.

9 Claims, 8 Drawing Sheets

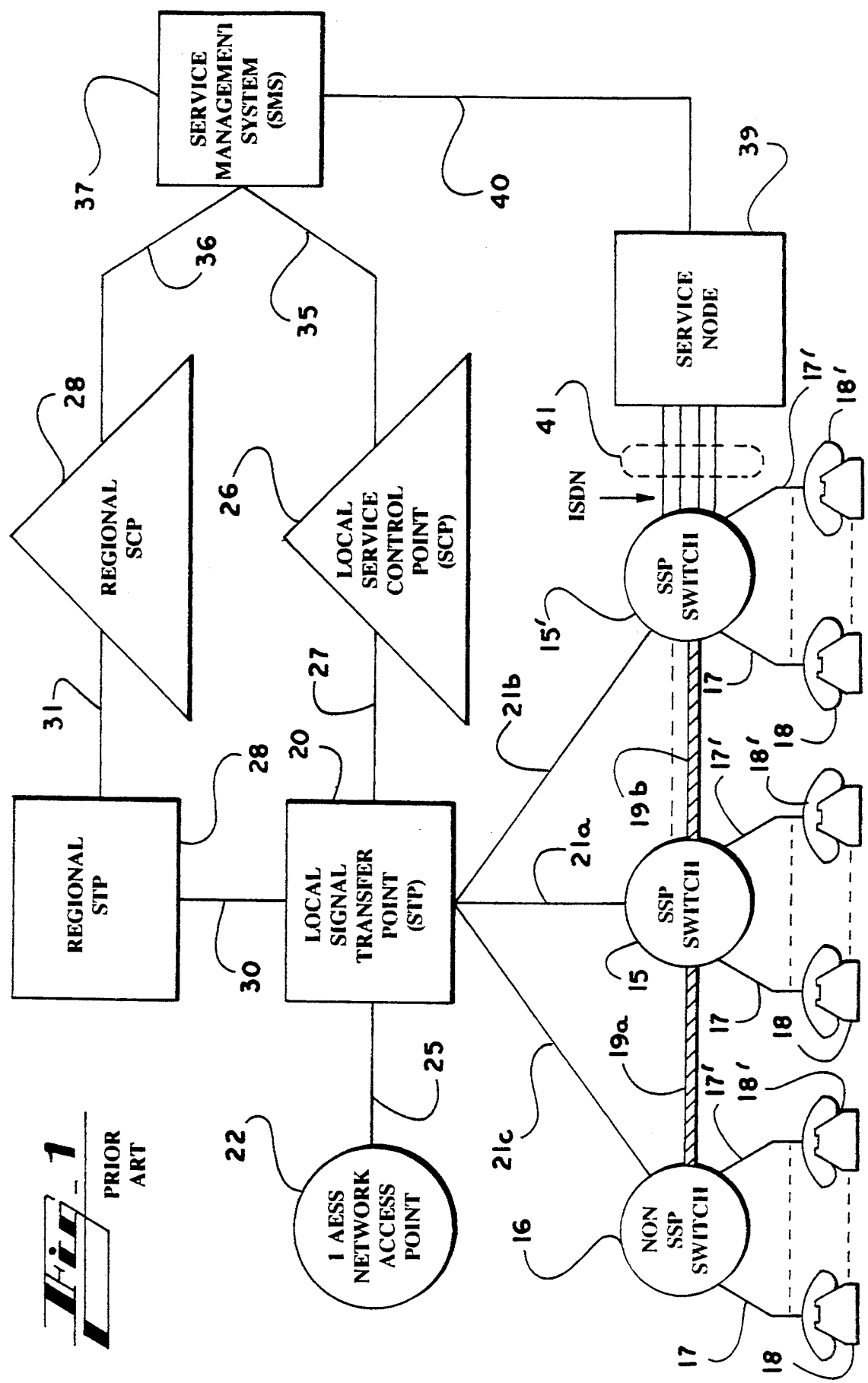

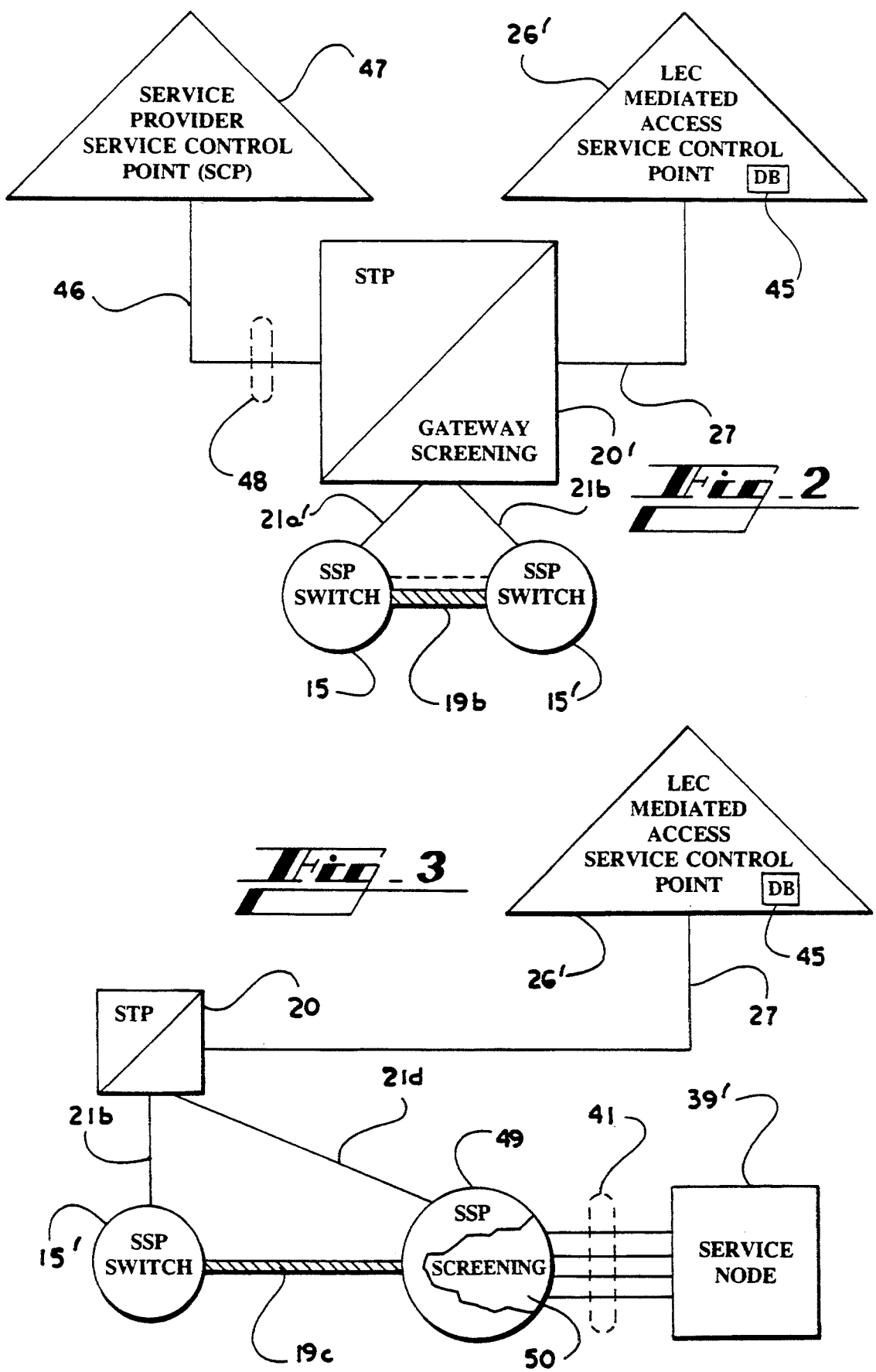

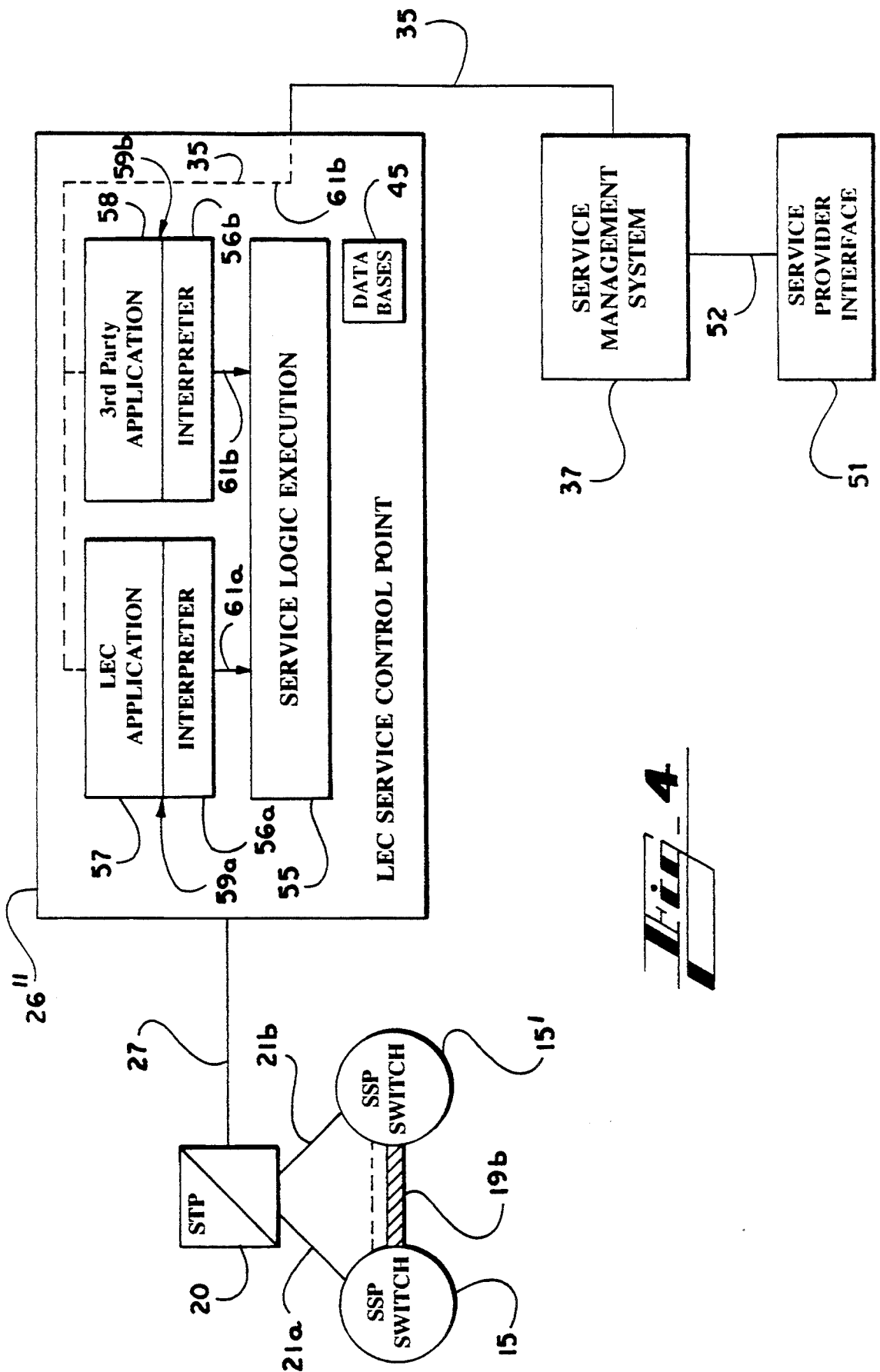

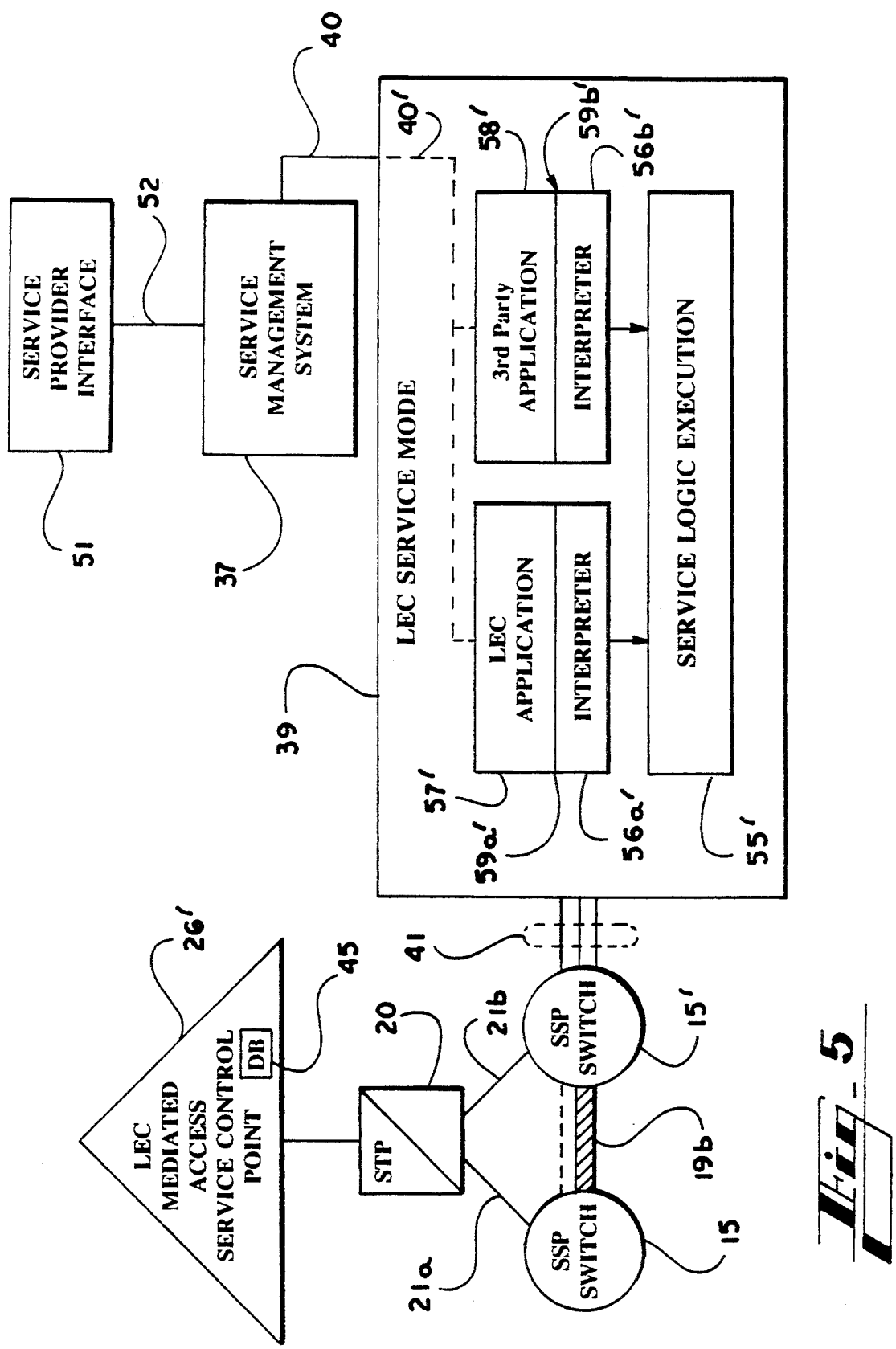

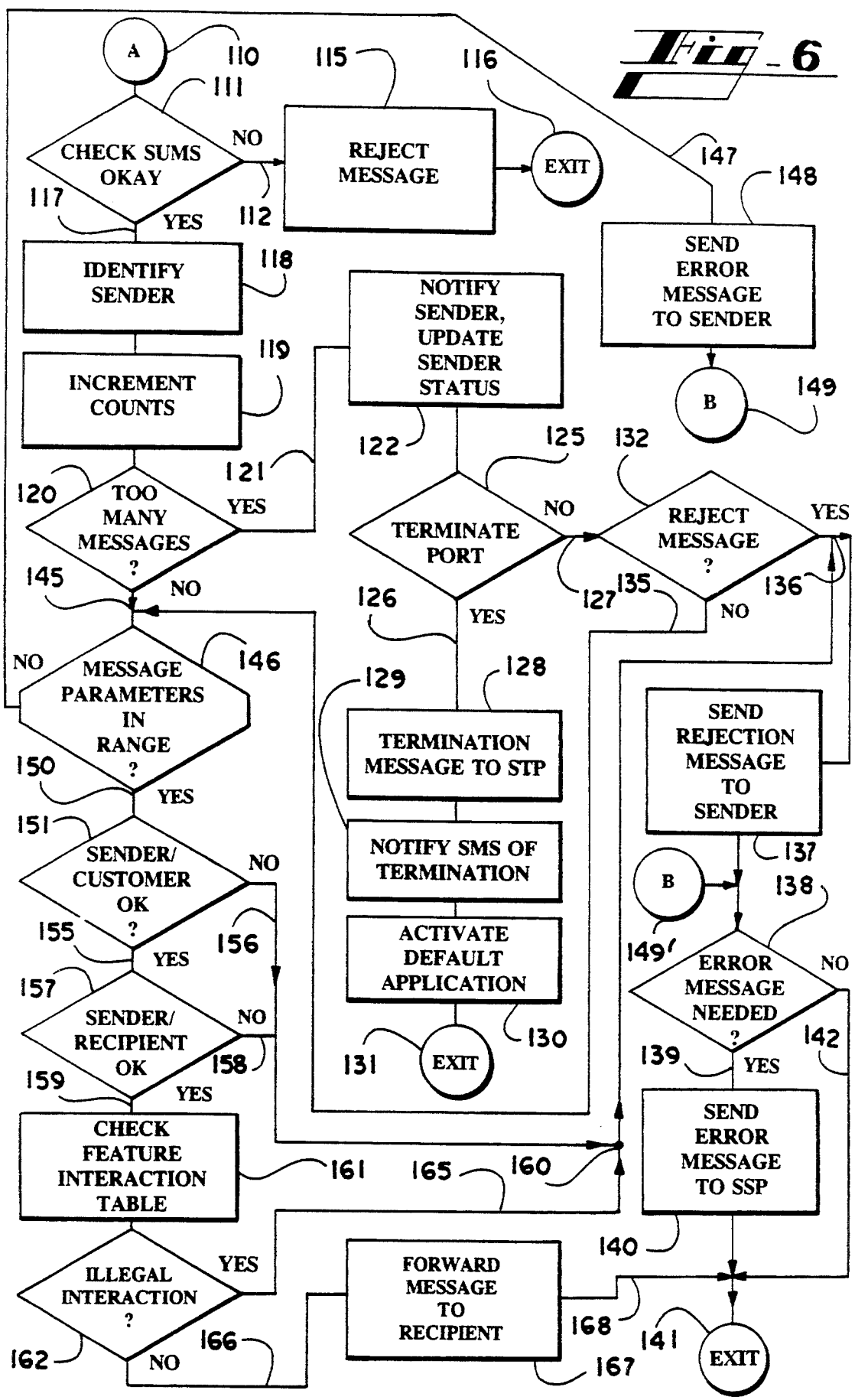

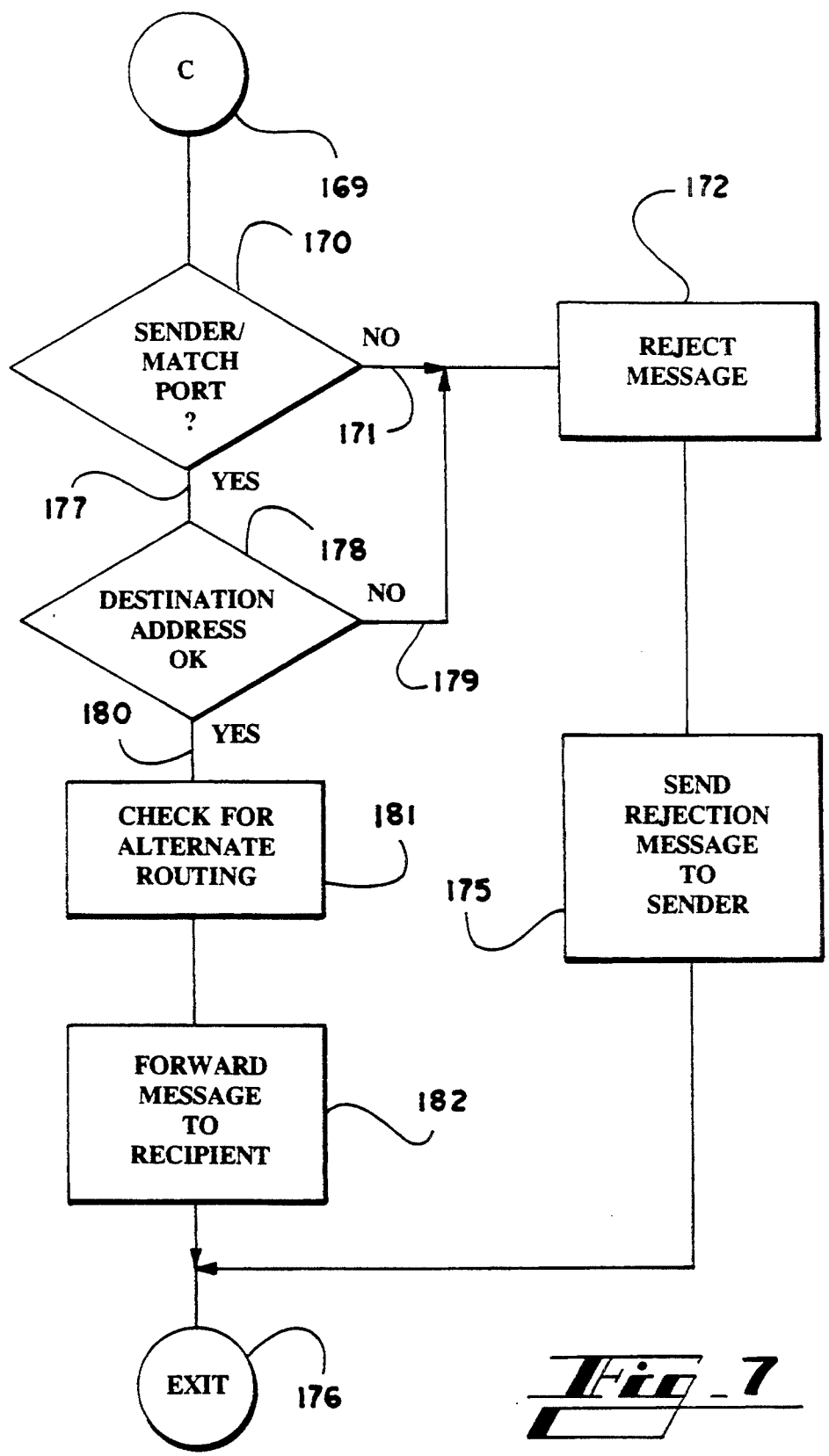

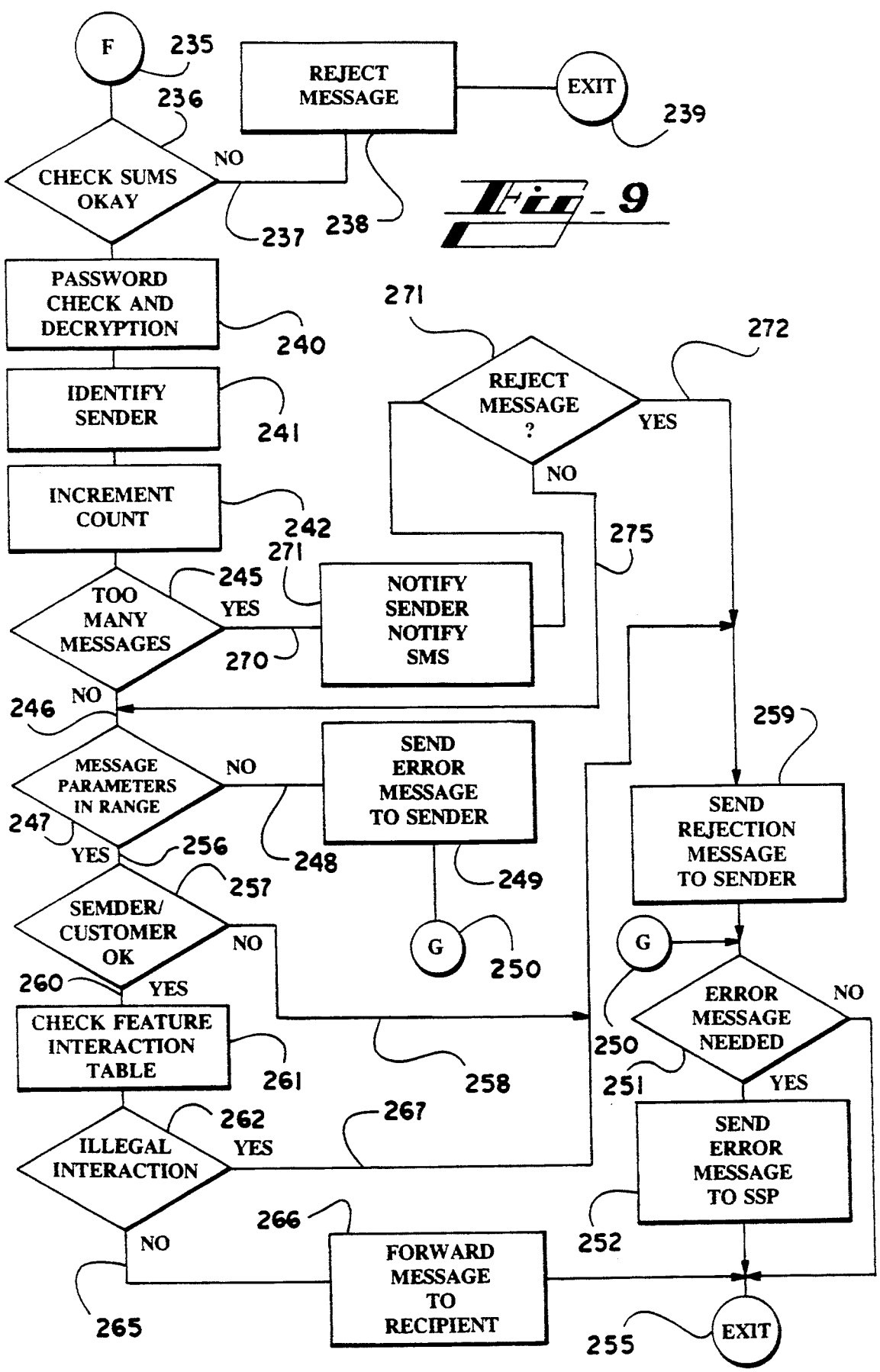

MEDIATION OF OPEN ADVANCED INTELLIGENT NETWORK INTERFACE FOR PUBLIC SWITCHED TELEPHONE NETWORK

This is a continuation of application Ser. No. 08/083,984, filed Jun. 28, 1993, now abandoned.

TECHNICAL FIELD

The present invention relates to the field of switched telephony and in particular is a method of mediating message content and network impact that will be allowed by providing access to the advanced intelligent network associated with modern telephone switching systems to a wide range of entities other than a telephone service provider.

BACKGROUND OF THE INVENTION

In the slightly more than a century of having telephone service available in the United States, the public switched telephone system has constantly evolved and grown in complexity, size, and capabilities. From the days in which calls were routed by a human operator working a plug board to switch and complete calls, the capacity of the system in both volume of traffic and service options has expanded greatly. A telephone company central office or central office switch is a device to which multiple subscriber lines are connected, each of which is terminated by a telephonic device of a customer. For conventional residential telephone service, one or more telephone sets will be connected to the subscriber line. Additionally, the central office has multiple trunk circuits connecting it to other central offices. Other trunk circuits are provided to customers, such as trunks feeding a private branch exchange (PBX) switch in a business office.

Some early developments of enhanced telephone service include the introduction in the early 1960s of direct long distance dialing. Prior to that time, all long distance toll calls had to be handled by one or more human operators who set up the call circuit and activated billing equipment. An important feature of the enabling technology for direct long distance dialing is the capability of switches to collect, store, and forward data identifying the dialed digits, i.e., the called number. These were transmitted through the network, as the call was set up via a well known signaling scheme known as multifrequency (MF) signaling. MF signaling is a species of in-band signaling in that the information signals (identification of the called number) was transmitted by signals within the voice frequency band, over the same trunk circuits that carried the voice signal once the call was completed. This technology allowed a much higher volume of long distance traffic to be handled and helped to significantly improve telephone service and to meet the demand for more and more service in the United States during the 1960s and 1970s. The major drawback of in-band signaling techniques was that they occupied voice trunk capacity during call set up. Furthermore, if the call could not be completed for some reason, such as the called number across the country was busy, cross country trunk capacity was occupied while the call set up migrated its way through the network and the report of the busy was returned back over the voice lines to the calling party. Five to ten seconds, for thousands and thousands of busy calls per day, translates to significant usage of trunk capacity.

In the late 1970s and early 1980s, American Telephone & Telegraph Company (AT&T) developed early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling, if a caller in Atlanta is dialing a number in Seattle, the identity of the called number can be transmitted over the interoffice signaling data links from the originating central office in Atlanta to the terminating central office in Seattle. The terminating central office is the central office that services the called number. If the called number is busy, data providing this information is transmitted back over the interoffice signaling link to the originating central office in Atlanta that locally provides a audible busy signal to the caller. Therefore, no long distance trunk capacity is occupied during this process and the voice circuits between Atlanta and Seattle that formerly would have been used to attempt to complete the call remain free for other uses. If the called number in Seattle is not busy, various devices in the network respond to the information about this call to assign interoffice trunks to set up a connection for the call, and it is then completed.

The public switched telephone network has evolved in the 1980s to a complex and very versatile system, most of which supports and is controlled by a form of common channel interoffice signaling. The basics of this network were designed by AT&T. Development of the network by the Regional Bell Operating Companies (RBOC) as well as other independent local telephone service providers has continued since the judicially mandated divestiture of local exchange carriers by AT&T in 1984. The basic architecture of the switched telephone network is, in significant parts, identical throughout the United States and the developed industrialized world including western Europe and Japan. The specifics of the current network described in this specification are those employed by the RBOCs and other local exchange carriers operating in the United States. This network architecture is used by all modern telephone switching systems in the United States and is virtually identical to modern systems in western Europe and Japan. It is commonly referred to as the Advanced Intelligent Network (AIN). The need for the present invention results from an event that many people familiar with the telephone business in the United States believe will be forthcoming in the near future: provision of access to the Advanced Intelligent Networks operated by local exchange carriers to third parties so that they may provide competitive telephone related services to local exchange carrier subscribers. In other words, it is believed likely that either voluntarily or by regulatory mandate, the local exchange carriers (LECs) (i.e., the local telephone service providers) will be required to allow others to access the Advanced Intelligent Network that controls many modern features and services offered by telephone companies, including the setting up and taking down of voice connections.

In the modern intelligent public switched telephone network, the same signaling path described above that is used for basic call set up, take down and routing, is also used to provide enhanced custom calling features and to control the operation of billing equipment and maintain billing records. Thus, it will be appreciated that allowing access to this network to parties other than the local exchange carrier is a proposition that is fraught with peril. The careless or malicious party with access to the digital network that controls the telephone system and access to information stored therein can seriously hamper proper operation of the public switched telephone network, corrupt data stored therein, including billing data, or surreptitiously obtain private information stored within the network unless adequate precautions are taken if and when access to third parties is provided. Therefore, the present invention has been developed in anticipation of open access to the intelligent network of the public switched telephone system.

In order to understand both the need for the present invention and its implementation, it is first necessary to understand the fundamental architecture of the modern Advanced Intelligent Network and the points at which an interface may be provided to third parties. FIG. 1 of this specification is a block diagram representing at least part of the AIN of a typical local exchange carrier. While the diagram is simple, the components thereon are well known to those skilled in the art. A plurality of central office switches is provided in a typical public switched telephone network. These are indicated as SSP switches 15—15' in FIG. 1. The dashed line between these indicate that the number is arbitrary. Also, non-SSP switches, such as switch 16 are also included within the network. SSP is an acronym for Service Switching Point.

The difference between an SSP central office switch and a non-SSP central office switch is that the former includes intelligent network functionality. This is an indication that the switch is equipped with appropriate hardware and software so that, when a set of predetermined conditions are detected, the switch will initiate a trigger for a predetermined state of a call on a subscriber line, generate the trigger as an appropriate message to be sent out over the AIN, suspend handling of a call until it receives a reply from the network instructing it to take certain action. In the alternative, the switch will have a default task to execute if a timeout occurs and no response is provided by the network to the query made by the switch. In summary, the SSP switches are those that are fully equipped to deal with and take advantage of the Advanced Intelligent Network described herein.

Non-SSP switch 16 is an electronic switch that can generate certain rudimentary packets and provide them over the network, but which must rely on other equipment, described in greater detail hereinbelow, to provide subscriber lines connected to such a switch with more complex features and services available in the intelligent network. Central offices 15—15' and 16 each have a plurality of subscriber lines commonly designated as 17—17', connected thereto. Typically, the number of subscriber lines will be on the order of 10,000 to 70,000 lines. Each of subscriber lines 17—17' is connected to a terminating piece of customer premises equipment, that is represented by a like plurality of telephone sets 18—18' for each of the switches.

Interconnecting central office switches 15 and 16 are a plurality of trunk circuits indicated as 19a and 19b in FIG. 1. These are the voice path trunks that interconnect the central office and over which calls are connected when completed. It should be lo understood that central office trunking in a typical urban environment is not limited to a daisy chain arrangement implied by FIG. 1. In other words, in a typical network, trunk circuits will exist between central office switch 15' and central office switch 16. Therefore, when a local call is made between two central offices, if a direct trunk connection exists between the offices, and is not busy, the network will assign that trunk to the completion of that particular call. If there is no direct trunking between the two central offices, or the direct trunks are all in use, the call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter exchange carrier switches that switch nothing but long distance trunk circuits are included.

Most of the intelligence of the intelligent switched telephone network resides in the remaining components shown on FIG. 1. These are the computers and switches that embody the current version of the common channel interoffice signaling scheme mentioned above. Each of switches 15 through 16 is connected to a local signal transfer point (STP) 20 via respective data links 21a, 21b, and 21c. Currently, these data links are 56 kilobit per second bidirectional data links employing a signaling protocol referred to as Signaling System 7 (SS7). The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data and a routing label. A service information octet is provided that identifies a priority of the message, the national network of the destination of the message, and the user name identifying the entity that created the message. Also, certain control and sequence numbers are included within the packet, the uses and designations of which are known to those skilled in the art and described in the above referenced ANSI specification.

All of the SS7 data packets from the switches go to a signal transfer point (STP) 20. Those skilled in the art will recognize that signal transfer point 20 is simply a multi-port high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 20 are conventionally installed in redundant pairs within the network so that if one device fails, its mate takes over until the first STP is able to return to service. In practice, there are redundant data links between each of central office switches 15 through 16 for enhanced reliability. For the sake of simplicity of the drawings, the redundant devices have not been illustrated in the drawing figures in this specification.

Also connected to signal transfer point 20 over SS7 data link 25 is a 1AESS network access point (NAP) 22. Network access point 22 is a computing device programmed to detect trigger conditions. It requires the support of an SSP switch to notify AIN network systems of these trigger detection events. An SSP can support multiple NAP switches. Logically, this SSP is designated as the destination address for many of the packets generated by the network that would otherwise be routed to the 1AESS NAP if it were an SSP equipped switch.

Much of the intelligence, and the basis for many of the new enhanced features of the network reside in the local service control point (SCP) 26 that is connected to signal transfer point 20 via SS7 data link 27. As is known to those skilled in the art, service control points are physically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate one to twenty seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network data bases used in providing enhanced services. The computers embodying the SCPs can execute at a speed on the order of 17 million instructions per second. Using the SS7 protocol, this translates to about 50 to 100 transactions (query/response pairs) of network messages per second.

Service control point computers were initially introduced into the network to handle the necessary translations and billing transactions for the implementation of 800 number service, i.e., toll free (to the caller) long distance service. An 800 number subscriber has at least one dial-up line number that is to be called when a call to that subscriber's 800 number is placed. There is no physical central office or area of the country that corresponds to the 800 area code. It is significantly more economical to provide a few central locations at which the lookup of the directory number for an 800 call can be made than to provide the translation information redundantly at many central office switches. Currently, service control points also include data bases for credit card call transactions.

Also, service control points include data bases that identify particular service customers. In order to keep the processing of data and calls as simple and generic as possible at switches, such as switches 15—15′, a relatively small set of triggers are defined at the switches for each call. A trigger in the network is an event associated with a particular subscriber line that generates a packet to be sent to a service control point. The trigger causes the service control point to query its data base to determine whether some customized calling feature or enhanced service should be implemented for this particular call, or whether conventional plain dial-up telephone service should be provide for the call. The results of the data base inquiry are sent back to the switch from SCP 26 through STP 20. The return packet includes instructions to the switch as to how to process the call. The instruction may be to take some special action as a result of a customized calling service or enhanced feature, or may simply be an indication that there is no entry in its data base that indicates that anything other than plain telephone service should be provided for the particular call. In response to receiving the latter type message, the switch will move through its call states, collect the called digits, and generate further packets that will be used to set up and route the call, as described hereinabove.

Similar devices for routing calls among various local exchange carriers are provided by regional signal transfer point 28 and regional service control point 29. The regional STP 28 is connected to local STP 20 via an SS7 data link 30. The regional STP 28 is connected to the regional SCP 29 via a data link 31 that is physically and functionally the same as data link 27 between the corresponding local devices. As is the case with the local devices, regional STPs and STCs are provided in mated redundant pairs for the purposes of reliability.

Both local and regional service control points 26 and 29 are connected via respective data links 35 and 36 to a service management system (SMS) 37. The service management system is also implemented by a large general purpose digital computer and interfaces to business offices of the local exchange carrier and interexchange carriers. The service management system downloads information to the data bases of the service control points 26 and 29 when subscribers modify their ensemble of AIN services. Similarly, the service management system downloads, on a non-realtime basis, billing information that is needed in order to appropriately invoice telephone company subscribers for the services provided.

The modern Advanced Intelligent Network also includes service nodes (SNs) such as service node 39 shown in FIG. 1. Those skilled in the art will be familiar with service nodes, which are physically implemented by the same types of computers that embody the service control points 26 and 29. In addition to the computing capability and data base maintenance features, service node 39 also includes voice and DTMF signal recognition devices and voice synthesis devices. Service node 39 is connected to service management system 37 via a data link 40 that services the service node in essentially the same way it services SCPs 26 and 29. While service node 39 is physically quite similar to SCP 26, there are some important differences in the uses to which it is put. Service control points such as SCP 26 normally implement high volume routing services, such as call forwarding and 800 number translation and routing. They are also used for maintenance of and providing access to high volume data bases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

By contrast, service nodes, such as service node 39, are used principally when some enhanced feature or service is needed that requires an audio connection to the call or transfer of a significant amount of data to a subscriber over a switched connection during or following a call. As shown in FIG. 1, service node 39 is typically connected to one or more (but normally only a few) switches via Integrated Service Digital Network (ISDN) links shown as 41. Thus, services that are implemented during a call (i.e., after completion of ringing or called subscriber pick up) usually employ the facility of a service node such as service node 39.

To give the reader an example, voice announcement of a calling party is a custom feature that is implemented via service node 39. Assume a subscriber dials the number of another subscriber, Ms. Jones, who subscribes to a service to provide voice announcement of incoming calls. One of the call progress states for an SSP equipped switch occurs after collection of the dialed digits when a termination request trigger is generated by the switch. This trigger consists of an SS7 data packet that is routed through STP 20 to SCP 26 and identifies the particular called party number. The SCP looks up the record for the directory number associated with Ms. Jones' phone line and detects that she is a subscriber to a service that provides voice announcements identifying incoming calls. SCP 26 then sends packets back over data link 27 to STP 20 that are routed to both the central office associated with the calling party's subscriber line and that of Ms. Jones.

The central office of the calling party is instructed to wait or place ring back on the calling party's subscriber line. Another packet is routed to switch 15'. It includes the identity of Ms. Jones' directory number, the calling party number, and a request for access to a voice synthesizer channel in service node 37. Switch 15' establishes a voice and data circuit over ISDN links 41 with the service node and passes a packet (in an appropriate ISDN format) to the service node. The service node then queries its data base to determine if there is an entry in Ms. Jones' record (actually the record for her directory number) for the particular calling number.

In the meantime, the necessary voice trunks have been connected between central office 15' and the central office serving Ms. Jones' telephone line and thus, a voice path exists between the synthesizer in service node 39 and Ms. Jones when answer supervision is returned on her subscriber line. The synthesizer will then announce the identity of the calling party and the person answering Ms. Jones' telephone can take appropriate action (such as pressing a particular number on the phone) to indicate whether or not they want to receive the call. The DTMF number is recognized by a DTMF recognition circuit in the service node that is likewise bridged onto the voice circuit. The service node then generates appropriate packets indicating whether the call has been accepted or rejected that travel over the ISDN link 41 to switch 15'. In the switch, protocol translation takes place so that the information in these packets is formatted into proper SS7 protocol packets that are then passed on to signal transfer point 20 and routed to appropriate offices to either set up the voice link between the calling party and Ms. Jones' subscriber line, or to provide appropriate audible indication (such as busy or reorder tone) to the calling party.

The foregoing description is a basic overview, together with a few examples, of the operation of the Advanced Intelligent Network that is a modern public switched telephone system. As will be apparent to both those skilled in the art and the casual but interested reader of this specification, the integrity of the data packets passing through the network is crucial to its operation. The integrity of the packets must be maintained in order for the system to function properly so that calls may be completed. Furthermore, since the SS7 data packets control the allocation of voice circuit capacity, it is critical to proper operation of the network that spurious or unneeded requests for trunk capacity not be generated within the network.

One result of the power and versatility of the modern intelligent switched telephone network is the possibility that inconsistent or problematic conflicting requests can be generated. One common example that needs to be avoided is known as a trigger loop. In its simplest form, consider the situation in which two subscribers of an AIN call forwarding custom calling feature each decided to go visit the other. In accordance with the rules of call forwarding, they pick up their phone and dial the appropriate digits to indicate the telephone number associated with their destination. This information is stored at service control point 26 for each subscriber.

If someone calls one of these subscribers, a termination request trigger for one of the telephone lines is generated. The SCP 26 looks in its data base and reports that this call should be forwarded to the other telephone number under consideration. This generates a packet that allocates a trunk circuit between the two telephones in order to complete the call to the forwarded destination. After this happens, the network generates a termination request trigger for the number to which the first subscriber's call has been forwarded. This trigger is acted upon by the SCP by noting that calls to that phone have been forwarded to the other friend's phone. In response to this, if nothing else is done, the network will allocate a second trunk circuit back from the second friend's phone to the first friend's phone, and likewise generate a termination request trigger identical to the original one. The process would continuously repeat itself.

If left unchecked, such a trigger loop would, very quickly (in view of the speed of the computers involved) allocate all of the existing trunk capacity available between these two friend's subscriber lines to a call that will never be completed. This would shut out all of the calls between these offices and furthermore occupy much alternate routing trunk capacity. Since these types of services are currently only under the control of the local exchange carriers, they will program their service control points to recognize a condition of a trigger loop and to terminate its operation in a graceful way so that trunk capacity is not tied up in a wasteful manner. Other solutions are possible for this specific problem, but there are many related scenarios, such as intra-switch trigger loops, or other more complex cases, which must be considered.

It should be quickly appreciated that the ability to quickly detect this type of trigger loop resides in the fact that the service control point computing device has access to all information about call forwarding orders in its data base, or in a data base that it can access over the network. The prospect of allowing private third party entities access to the SS7 signaling network that can reroute calls in a manner so that its destination is not reflected in the data bases maintained by the local exchange carrier leads to the possibility of undetected trigger loops when third parties are allowed to generate network orders for routing calls to subscriber lines other than the line associated with the directory number dialed at the call's origination. Furthermore, the ability to reroute calls via third party access to the network on its face leads to the possibility that the mischievous or unscrupulous operator could generate routing orders that would misdirect calls intended for one business to those of a competitive business.

The inventor of the present invention believes that opening the network SS7 data links to third parties so that they may provide customized services over the telephone network will be regulated so that the third party providers will not be required to provide extensive information to the local exchange carrier about the nature of the service provided. Thus, the prospect of opening the network to third party suppliers of enhanced calling services is one that requires careful mediation at the interface between the local exchange carrier network and the third party, and monitoring of activity and data packet messages to protect both the integrity and operation of the network and the privacy of all service providers' subscribers.

Furthermore, it is believed that there will be no prohibition against individual telephone subscribers ordering different forms of enhanced services from separate third party vendors. Under these circumstances, the local exchange carrier might have no information about various services, and even the third party suppliers might not know that a particular subscriber is a customer of another entity for another service. Under these circumstances, the order in which triggers are passed across an interface to a third party provider of services can affect the net result of the services to the subscriber. For example, if a particular subscriber was a call forwarding customer of one service and a call screening customer of another service, the order in which the triggers were reported to the respective providers of these services will affect whether all of the subscriber's calls are screened. A call screening service is one that will block incoming calls originated from certain subscriber lines. It is a service that provides the possibility of reestablishing some of the privacy that the ubiquitous use of telephones has eroded in the modern world.

If the termination request trigger for the particular called subscriber is first provided to the entity providing the screening service, then all calls to the subscriber will be properly screened. If, however, the trigger is first provided to the entity providing the forwarded service, and the subscriber has indeed forwarded his or her calls, the next termination request trigger that is generated will be for the number to which the line has been forwarded. This will not be detected as a trigger that requires service by the entity providing the screening process and thus, forwarded calls will not be screened. It is therefore believed by the inventor that a hierarchy or sequence of provision of triggers for various services may need to be specified by subscribers in addition to the technical constraints that require avoidance of undesirable feature interactions.

It is anticipated that third party enhanced service providers who are given access to the intelligent network will be billed for use of the network capacity based on the number of query/response pairs they generate within the network. This is believed by the inventor to be the most likely scenario for a tariff for this service since it is relatively easy to maintain a count that is a measure of the use of local exchange carrier equipment that is made by the outside service provider. So long as the Advanced Intelligent Network remains closed, local exchange carrier designers could predict network traffic and thus, make plans for expansion of the capacity of the network with a relatively high degree of confidence. The opening of the network to third party providers will require some estimation from the third party service providers as to the number of query/response pairs (i.e., packets or network messages) that provision of their service will produce so the local exchange carriers can estimate the impact of the outside service on the network.

The impact can be manifested in two basic ways. The first is a consideration of total packet traffic generated by the outside service provider over a relatively long period of time, such as a day. The second aspect that must be considered is the time rate of generation of packets by the third party service provider. Outside service providers may provide services that have a relatively low average number of messages per unit time over each day, but may generate a very high volume of traffic in a small window of time. Numerous occurrences of high density traffic bursts from several non-local exchange carrier (non-LEC) entities can impede the working of the rest of the telephone network, including the slowing down of the delivery of dial tone, or the occupation of an undue amount of trunk capacity. With LEC provided services, the local exchange carrier can customize responses to high message content services, such as provision of radio contest call-in lines. However, it is anticipated that local exchange carriers will have very little information about the nature of the services provided by third parties if the network is opened and thus, there is a need for mediating traffic and protecting the network in real time at the interface provided to the third party supplier. There is a need for the network to be able to respond by disabling a problem source that is generating message traffic at too high a density, or is failing to respond appropriately to triggers and other messages routed to it and therefore, causing a large number of devices, particularly at SSP switches, to wait for a timeout before proceeding with call handling.

Also, much of the information maintained in data bases within the network can constitute sensitive business information of the customers of the local exchange carriers. Information on the rate at which a business receives telephone calls, the 800 number traffic it experiences, or even the temporal characteristics of calls to particular businesses can constitute information that might be useful to a business competitor of an LEC customer. Therefore, if the network is opened, there is a need to carefully check and restrict the type of information to which non-LEC customers are given access.

The current use of separate SS7 signal packets to control call routing was, in significant part, motivated by a need to reroute calls in order to provide custom calling services or enhanced services. The simplest example is, of course, the forwarding of a call intended for one subscriber line to another one. However, the ability to reroute calls to a subscriber line other than that associated with the number dialed also leads to a potential for business mischief if and when the network is opened to third party generators of data packets.

For example, if not controlled, a competitor of one business that uses inbound phone calls as a significant source of new customers could generate a packet on the network that instructed a service control point computer to forward a call from a competitor to the phone of the business entity that generated the network message. This could be done periodically, leaving the forwarding order in place for only short periods of time, so that a certain percentage of incoming calls were bled off in this fashion. Thus, in the event the network is opened to third parties, there is a need to protect the integrity of the call routing process from unauthorized or improper attempts to reroute calls or interfere with calls that the third party entity having access to the network should not affect.

In summary, the Advanced Intelligent Network is a complex high speed, high traffic volume packet switched messaging arrangement that provides a great deal of versatility in the handling of telephone calls. Most network elements, and in particular the SSP switches, are designed so that a relatively simple format of a query message is generated upon certain events and the switch will wait for a response from the network before proceeding with call processing. These procedures employ a watchdog timer that will timeout in the event a response to the query is not received. However, in circumstances where further call progress was controlled by the occurrence of timeouts, as opposed to a valid response, for a large percentage of the calls being processed, there would be a significant deterioration in the performance of the network. It would cause customers to experience undue delays in call processing or the inability to have enhanced features properly provided. Fundamentally, it is the versatility of the network that leads to its vulnerability to inappropriate network messages. Therefore, if and when the network is opened so that access to the Advanced Intelligent Network is available to third party enhanced service providers, there is a need to provide mediation of message traffic across the interface between the local exchange carrier and the third party service provider, and to protect the network from mischief, human error, and equipment failure on the third party service provider's side of the interface.

SUMMARY OF THE INVENTION

The present invention is a method of mediating messages passed in packets across an interface into the Advanced Intelligent Network. While the focus and the motivation of the present invention has been the prospective opening of the Advanced Intelligent Network to parties other than local exchange carriers, the method of the present invention is applicable to any source of AIN messages that can affect call processing anywhere in the network. Because of some types of mediation that are required or desirable in the practice of the present invention, it may be advantageous to mediate message packets from all sources on the network, both those maintained by local exchange carriers and those provided across an interface from third party service providers. This is particularly true with respect to mediation of service interactions since there may be undesirable effects of the interaction of a service provided by a third party service provider with a service provided by a local exchange carrier.

Stated in its broadest form the present invention is a method that examines the number and content of messages traveling in at least one direction across a defined interface to an intelligent network that controls a switched telephone system. It includes the steps of examining parameters of the message, directory numbers affected by the message, and a sender identifier indicative of the entity represented to have originated the message. These are compared with stored or predetermined quantities to determine if it is appropriate to pass the message on to a recipient and to let the network act on the instructions within the message.

In one form, an interface is defined between a network signal transfer point (STP) and a service provider service control point (SCP), the latter being one that is provided by either a third party service provider or the local exchange carrier. A mediated service control point is provided that includes at least one data base containing customer records for customers of the local exchange carrier. Within the record for each customer is an indication of which service providers are authorized to alter calls involving the directory number associated with the customer.

When a message passes across the interface from the service provider service control point, a sender identifier field in the message is read. This is preferably accomplished, at least initially, at a signal transfer point. The signal transfer point compares the sender identifier with a record it maintains of a port identifier that designates an authorized provider of packets to the AIN across this particular interface on a particular physical port. If the two do not match, the inbound packet is rejected.

If the message passes this test (and possibly others), it is passed on to the mediated SCP for further mediation. The mediated SCP determines whether the message is one that requests alteration of call processing for an affected customer directory number. If this is the case, the affected customer identifier within the message is read and that customer's record is looked up in the data base at the mediated SCP. Each customer record contains an indication of which service providers are authorized to alter calls involving that particular directory number. In other words, the customer record contains an indication of the providers of enhanced or custom calling features for which the LEC customer associated with this phone number is a subscriber. If there is no entry for the entity that corresponds to the sender identifier in the message, the message is rejected by the mediated SCP because it appears to be an attempt by the service provider to affect the call processing of a directory number for a person who is not a customer of the service provider.

Preferred forms of the invention also detect a destination address for inbound packets and determine, from records maintained in the data base at the mediated SCP, whether this particular service provider is allowed to send messages to the destination address. An example might be a destination address of a record within an LEC billing data base. If the service provider on the other side of this particular interface is not authorized to alter such billing records, inbound messages across the interface that are directed to LEC billing records will be rejected.

According to another aspect of the present invention, the mediated SCP maintains service provider records in a data base, which records include a message rate number that is an indication of the authorized rate of message traffic for each service provider across a particular interface. This information is required in order to allow the operator of the Advanced Intelligent Network to make sure that some service providers do not over load the network with message traffic so as to impede its overall operation, or to slow the ability of other service providers to respond to requests for services from their customers. An inbound message rate is determined for each service provider. In its preferred form, the inbound message rate is the number of messages per unit time over a relatively short window of recent history. In other words, this number will increase in response to a burst of a large number of messages over a short period of time.

It is preferable to determine the inbound message rate as close as possible to the physical interface, it preferably being done by simply detecting the number of packets that pass across a particular physical port at the interface. However, this task needs to be performed at a physical element that has the necessary calculating and data storage capacity. In one preferred form of the present invention, this is accomplished by detecting the number of packets inbound from a particular service provider to a service control point. In an alternate form, this is accomplished by detecting the number of messages that pass on an inbound ISDN port from a service node. It can be accomplished at other points in the network.

If the inbound message rate exceeds the authorized message rate number by at least a predetermined amount, the AIN will establish a condition of blocking further inbound messages from the service provider. The blocking may be temporary, or may require affirmative action on the part of the service provider to alleviate the message rate problem before the block will be removed by the AIN.

Since the blocking of messages from a service provider will disrupt the provision of enhanced services, or may even disrupt the provision of any telephone service, for customers of the service provider whose messages are blocked, preferred forms of the present invention effect a default application to substitute for the applications implemented by the service provider that has been cut off from the AIN. Even if a service switching point has a default application that it will implement upon timeout of its period of waiting to receive a reply message from a trigger, it is highly desirable to have a mediated SCP implement a default application so that customers of the blocked service provider do not all experience the delays inherent in a default application controlled solely by multiple timeouts.

Therefore, when access of a particular service provider is blocked, as described hereinabove, a record of the blocked service provider is maintained in the mediated SCP. Further message traffic directed to the blocked service provider will cause a response, consistent with a default application, to be provided back over the network, usually to a service switching point.

In most instances, the default application will simply be the provision of what is commonly known in the telephone industry as Plain Old Telephone Service (POTS). However, certain messages from a customer of the blocked service provider may generate a reorder tone, or even a cut over to an announcement that informs the customer of the unavailability of the service from this particular service provider. For example, if a customer of the blocked service provider was a subscriber to a service of call forwarding, and it executed the dialing sequence to cause forwarding of his or her phone, this message can be detected by the mediated SCP that can then provide the customer with some audible indication that this particular service is temporarily unavailable. In addition to a somewhat rudimentary default application, it is possible that the operator of the AIN can provide a selection of default applications that could be invoked by the service provider in the event of an equipment failure or blocking of the port.

According to another implementation of the present invention, an interpreter language is defined for generating AIN messages from service control points or service nodes. In these embodiments, the interface to the AIN is the interface across which a service provider's interpreter language program statements are passed to the interpreter program. The interpreter program does all parameter checking and can easily force all messages generated as output to contain proper sender identifiers.

When the interpreter is implemented at a service control point, there is local access to the customer data base and the service provider data base so that messages that are legal, within the constraints of message parameters and the interpreter syntax, can be checked for legality under the above referenced constraint that a service provider may only affect telephone calls of its customers. When executing an interpreter language, the interpreter itself can query the customer records to determine if this particular service provider is authorized to affect calls from a particular directory number. If it is not, the generation of a message can be suppressed by the interpreter program without the need to have packets checked as they pass through the network.

Therefore, it is an object of the present invention to provide a method of mediating messages in the Advanced Intelligent Network, which messages may be originated by a plurality of service providers.

It is also an object of the present invention to mediate message traffic in the AIN across one or more open interfaces to service providers who are entities other than the entity that maintains the Advanced Intelligent Network, or the portion thereof where the interface is physically or logically located.

It is a further object of the present invention to mediate message traffic on an Advanced Intelligent Network for a switched telephone system to cause the network to reject certain messages based on the sender of same, including messages designed to affect the telephone service of non-customers of the sender, messages that come into the network over interface ports assigned to parties other than the sender indicated in the message, and those directed to network elements for which the sender lacks authorization to communicate.

It is still a further object of the present invention to provide a method of mediating data traffic provided through an open interface to the Advanced Intelligent Network that limits the rate at which messages may be passed across the interface from an outside service provider, blocks further inbound transmittal of messages to the network from such service provider if its constraints are not observed, and provides messages to effect a default application in the event such service provider is blocked from providing further messages.

It is still a further object of the present invention to provide a logical structure for mediating an open Advanced Intelligent Network that is susceptible to multiple physical implementations and providing certain mediation functions at multiple physical and logical locations within the network.

That the present invention meets these objects, and meets the needs that will be presented by an open Advanced Intelligent Network for a switched telephone system will be appreciated from the following description of various embodiments of the present invention.

BRIEF DESCRIPTION OF THE DRAWING

FIG. 1 is a block diagram of the existing Advanced Intelligent Network in a telephone system in the United States.

FIG. 2 is a block diagram of the apparatus that implements a first preferred embodiment of the present invention.

FIG. 3 is a block diagram of the apparatus that implements a second preferred embodiment of the present invention.

FIG. 4 is a block diagram of the logical and physical structure of a third preferred embodiment of the present invention.

FIG. 5 is a block diagram of the logical and physical structure of a fourth preferred embodiment of the present invention.

FIG. 6 is a flow chart showing the step of the preferred method implemented in the mediated access service control point in the embodiment of FIG. 2.

FIG. 7 is a flow chart of the steps of the preferred method implemented at the switching transfer point in the embodiment of FIG. 2.

FIG. 9 is a flow chart showing the steps of the preferred method implemented at the mediated service control point in the embodiment of FIG. 3.

DETAILED DESCRIPTION OF THE PREFERRED EMBODIMENT

Figure 8:
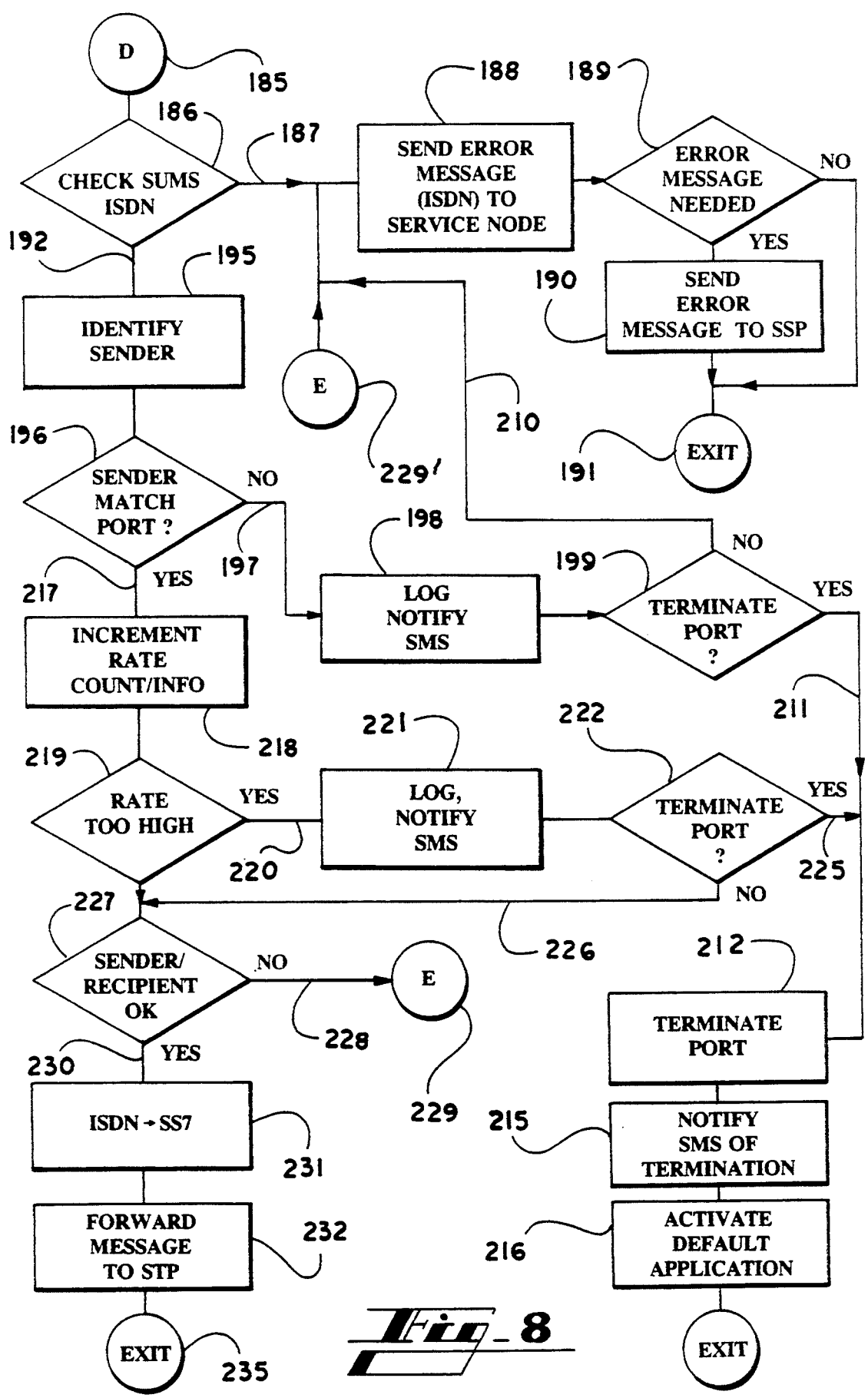
FIG. 8 is a flow chart showing the steps of the preferred method implemented at the service switching point in the embodiment illustrated in FIG. 3.

Turning now to the drawing figures in which like numbers reference like parts or steps, several alternate embodiments of the present invention will now be described. The existing Advanced Intelligent Network in a typical switched telephone system is shown in FIG. 1 and has been described in detail in the Background of the Invention section of this specification. The present invention contemplates, but is not limited to, four interfaces for providing access to the AIN. The first is an SS7 link into signal transfer point 20 to which a service provider service control point is attached. The second is to make ISDN link 41 the interface and have the service provider, either local exchange carrier or third party, control and operate a service node such as service node 39. The third location of the interface is an interpreter between an interpretive program language and the service execution logic within the existing computers in service control point 26. The fourth is a similar arrangement in the computer controlling service node 39.

The balance of this specification describes in detail two alternate embodiments of the present invention designed, respectively, for the first two interface points described above. The same logical functions are to be addressed in embodiments of the interpreters for the latter two interface points. Application of the steps and principles described in the first two embodiments to implementations of the other two embodiments will be apparent to those skilled in the art.

FIG. 2 shows a block diagram of the physical devices used in the first preferred embodiment of the present invention. Exemplary service switching point (SSP) central office switches 15—15' are illustrated thereon, being interconnected by trunks 19b. Each of the SSP logical nodes at these switches are connected by SS7 data links 21a and 21b, respectively, to a signal transfer point 20'. As used herein, numerals referenced with a prime indication are used to refer to devices that are very similar to their previously introduced counterparts, but which have some additional functionality added for the purpose of being used to implement the present invention. In the first preferred embodiment, certain gateway screening functions, described hereinabove in connection with FIG. 7, have been added to signal transfer point 20' to implement the present invention.

SS7 link 27 links STP 20' with the local exchange carrier operated mediated access service control point 26'. This device is physically the same as SCP 26 shown in FIG. 1. Its computer includes program instructions for executing certain steps of the preferred embodiment described hereinbelow in connection with FIG. 6 and the data bases contained in those computers, represented by block 45, contain both customer records as in the prior art and service provider records needed for effecting the present invention.

Another SS7 link 46 connects signal transfer point 20' to a service provider service control point 47. Generally, service provider SCP 47 may be operated by any entity that provides any form of a switched telephone service, although it will often represent an SCP operated by a party other than the local exchange carrier whose network is depicted in FIG. 1. For the embodiment of FIG. 2, the interface between the service provider SCP 47 and the existing Advanced Intelligent Network is a point along SS7 data link 46, which is referenced as 48 in the drawing of FIG. 2.

The embodiment of FIG. 2 executes the steps illustrated in FIGS. 6 and 7 described hereinbelow. The flow of data packets containing AIN network messages will be described in connection with FIG. 2 and the steps in the mediation process may be described in detail in connection with FIGS. 6 and 7. Mediation in the embodiment of FIG. 2 takes place at both the gateway screening functions of signal transfer point 20' and in the mediated access SCP 26'.

Generally speaking, most all packets between central offices 15—15' and service provider SCP 47 are first passed to, and then back from, mediated access SCP 26'. An example will help illustrate this.

Consider the example of a customer whose subscriber line is connected to SSP switch 15, and in which the customer goes off hook. SSP switch 15 generates a trigger in response thereto. The trigger is an AIN packet that contains a message indicating that this particular directory number has gone off hook. This packet is passed over SS7 data line 21a to STP 20'. The STP routes this packet over data link 27 to mediated access SCP 26' where it is examined with respect to information contained in a customer data base within data bases 45. When the trigger message is received by mediated access SCP 26', it checks in its data bases 45 and determines that particular triggers for this particular directory number should be passed on to service provider SCP 47 since there is an entry in the data base record for that directory number indicating that the subscriber who uses same is a customer of the service provider that operates SCP 47. It therefore prepares a packet corresponding to the trigger that is sent out over link 27 to STP 20', which will forward same on to service provider SCP 47. Some of the mediation steps described hereinabove take place and then the packet is repackaged by mediated access SCP 26' with a destination address corresponding to service provider SCP 47 and transmitted back out over SS7 data link 27. The signal transfer point 20' accepts this packet and passes it over SS7 data link 46 to the service provider SCP 47.

In response thereto, SCP 47 generates a packet addressed to SSP switch 15 indicating the appropriate next action to be taken, which in most cases will simply be for the switch to continue with normal call processing that will cause the switch to provide dial tone to the customer. When this inbound packet arrives at STP 20' over data link 46, the STP checks a sender identifier field in the inbound packet that should identify the service provider that operates SCP 47. STP 20 then checks an internally stored port identifier that corresponds to the service provider whose SCP 47 is connected to interface 48. These two values are then compared and, if they do not match, the inbound packet is rejected since it, on its face, contains a false indication of the source of the network message.

Assuming that this does not occur and the packet is passed by STP 20', the inbound response of the packet is passed over SS7 link 27 to LEG mediated access SCP 26' at which the mediation steps illustrated in FIG. 6 take place. If all is well, the packet message, with a destination address for SSP switch 15, is passed back over SS7 link 27 to STP 20' which in turn routes it over link 21a to switch 15.

As is described in greater detail in connection with FIGS. 6 and 7, conditions may arise in which STP 20' is instructed to terminate its receipt of inbound messages across interface 48. It is also possible that an equipment failure will occur within SCP 47 that will cause it to stop generating appropriate responsive message packets. Under either of these circumstances, it should be understood that mediated access SCP 26' is programmed to provide default applications in the absence of the network's ability to effectively communicate with service provider SCP 47. There is a wide range of choices of the default applications that will be apparent to those skilled in the art. However, the most common one will simply be provision of plain old telephone service (POTS). The provision of default applications that will continue to respond with appropriate instructions to messages from switches 15—15' significantly reduces the extent to which the Advanced Intelligent Network is made vulnerable to equipment failures or abuse on the service provider side of interface 48. In the absence of such default application, the SSP switches 15—15' would be made completely dependent on their internal default applications and they would only be stepped through these applications in response to time-outs of internal timers operated within the SSP. These timers limit the amount of time an SSP will wait for a reply to a previously transmitted outgoing message.

FIG. 3 shows a second embodiment of the present invention that allows service providers to provide a plurality of enhanced services from a service provider service node 39'. One aspect of this embodiment is that it allows functions that are conventionally controlled by service control points to be provided through a service node, as well as provision of in-band voice and data services that are conventionally provided by service nodes. In other words, a service node can interact with any switch connected to the SS7 network (as can an SCP), as well as directly originate and terminate communication connections. The ISDN links 41 constitute the interface between the Advanced Intelligent Network and the service provider source of packets in the embodiment of FIG. 3. A service switching point 49 is provided at a central office switch connected to SSP switch 15' by another plurality of trunks 19c. SSP 49 includes a portion of the mediation logic which is similar to that of gateway screening, as indicated at 50 in FIG. 3. An SS7 link 21d connects SSP 49 to STP 20.

A significant advantage to non-LEC service providers is made possible by the structure of the embodiment of FIG. 3. It should be understood that service node 39' may be embodied by relatively small computing devices connected to SSP 49 via an ISDN basic rate interface. As is well known to those in the art of telephony, subscription costs for an ISDN basic rate interface are currently about $100 per month whereas an SS7 circuit to a service provider service control point, such as that employed in the embodiment of FIG. 2, costs several thousand dollars a month under typical current tariffs. Thus, the embodiment of FIG. 3 makes it possible for relatively small or low volume service providers to provide enhanced telephone service through the Advanced Intelligent Network.

In the embodiment of FIG. 3, the mediation functions and gateway screening logic 50 are illustrated on FIG. 8. In the preferred form of this architecture for the present invention, the screening is preferably done on messages in the ISDN format and, if they are appropriate for passing on to STP 20, they are converted to SS7 format using existing conversion routines currently used in connection with the generation of AIN packets from service nodes. The balance of the mediation functions are performed in mediated access SCP 26'. It should be understood that this SCP is identical to SCP 26' shown in FIG. 2 except that it performs a somewhat different set of mediation tasks, as described hereinbelow in connection with FIG. 9.

In a manner analogous to the flow of packets described in connection with FIG. 2, packets from a switch, such as triggers, are routed through STP 20 to mediated access SCP 26'. Upon the SCP's detection of a trigger from a customer employing service node 39', an appropriately addressed packet indicative of the trigger is sent back over link 27 through STP 20, SS7 link 21d, and on to SSP 49. There it is converted from an SS7 packet to an ISDN packet containing equivalent information, and passed across interface 41 to service node 39'. The service node, upon generating an appropriate response in the form of an ISDN message, passes a responsive message back to the screening logic 50 where it is screened and converted back to SS7 format for retransmission over link 21d. From this link, it goes to STP 20 that routes it to mediated access SCP 26', which then performs its mediation tests for inbound packets. On the assumption that the inbound packet received from service node 39' meets all the criteria of the mediation tasks, the commands embodied in the inbound packet are reformulated into a packet that is addressed to the appropriate SSP central office, and it is then placed back on the network via SS7 link 27.

Turning next to FIG. 4, one of interpretive language embodiments of the present invention is illustrated. A service provider interface 51 is provided over a serial data link 52 to existing service management system 37. Service provider interface may be nothing more than a dial-in modem through which a service provider that has contracted with the local exchange carrier may load an application program via service management system 37 into service control point 26".

It should be noted that there are only slight modifications in the software running on LEC service control point 26" as compared to SCP 26 illustrated in FIG. 1.

Other than this, and the provision of an interface 51, the devices shown in FIG. 4 are identical to those existing in the AIN today. Thus, FIG. 4 represents a compact implementation of the present invention that requires little modification to the physical and logical structure of the existing Advanced Intelligent Network.

Within SCP 26", block 55 is labeled service logic execution. This represents application support services and an operating system for the computers embodying AIN SCPs. In the embodiment of FIG. 4, interpreters 56a and 56b are interpreter programs for running applications written in interpretive language. Two such applications, LEC application 57 and third party application 58 are illustrated in FIG. 4. A dashed extension 35' of data link 35 indicates that applications 57 and 58 may be downloaded via data link 35 from the service management system 37. In the embodiment of FIG. 4, interfaces 59a and 59b are the mediated interfaces between the service provider's source of AIN message packets and the Advanced Intelligent Network. Mediation is accomplished by interpreters 56a and 56b. The output from interpreter programs 56 comprises calls to a run time system of service logic execution 55, said calls being made over respective logical links 61a and 61b.

Interpreters 56a and 56b are very similar, but in most applications should not be identical. In particular, certain exclusions from the set of legal network messages that are controlled by interpreter 56b are exclusive to non-local exchange carrier service providers. The most immediately apparent one of these are network messages that affect local exchange carrier billing records for particular customers.

FIG. 5 shows an embodiment that is analogous to that of FIG. 4. In the embodiment of FIG. 5, the interpreter applications reside in service node 39 and are executed by the computer embodying same. The elements shown in FIG. 5 are identified with prime designations of the corresponding elements shown in FIG. 4. In the embodiment of FIG. 5, the applications 57' and 58' may be, and normally are, downloaded via data link 40 from service management system 37. Service logic execution run time system 55' is different from that of the corresponding element 55 in the embodiment of FIG. 4 in that it must generate output in the form of packets for an ISDN link, and these packets must be generated in recognition of their entry point into the network via service switching point 15' rather than a service control point.

As noted hereinabove, once one skilled in the art understands the mediation functions implemented by the embodiments of FIGS. 2 and 3, writing appropriate analogous instructions for interpreters 56b and 56b' for the embodiments of FIGS. 4 and 5, respectively, will be understood.

Turning next to FIGS. 6 and 7, the details of the mediation steps of the first preferred embodiment of the present invention, the hardware of which is illustrated in FIG. 2, is shown. In the flow charts of FIGS. 6-9, exit nodes designated by a capital letter are logically identical to corresponding entry nodes labeled with the same letter. Same have been used in order to avoid flow line crossings or large loops around the diagrams of these charts. FIG. 6 shows the mediation functions performed by the LEC mediated access service control point 26' of FIG. 2. When a packet is received over link 27 and stored in appropriate buffers, the code for performing the mediation steps is entered at point A, as indicated by reference numeral 110. First, the check sums are calculated at decisional step 111. This process is conventional in nature and uses check bits included in the packet to detect transmission errors. If the check sums are invalid, NO branch 112 is taken from this step to routine 115 at which the message is rejected and a request for retransmission of the message is ultimately generated over the network. Once this is accomplished, the mediation process is exited at node 116.

If the check sums are valid, YES branch 117 is taken to routine 118 at which appropriate fields of the packet are checked for a sender identifier. The sender identifier is a code that identifies the entity that created the message. At routine 119, current counts associated with the sender identified in routine 118 are incremented and appropriate timer values are stored. These counts are maintained for several purposes. One is to maintain the count of query/response pairs generated by a particular sender in order to effect billing of the third party service providers for the use of the Advanced Intelligent Network. Additionally, an inbound message rate at which packet messages are provided across interface 48 from the service provider operating SCP 47 is calculated. This incoming message rate is an average over a relatively short period of time. Additionally, a longer period average is maintained so that an alarm condition of excess message traffic can be detected. In the preferred embodiment, only the short period inbound message rate exceeding a predetermined value will cause interface 48 to be blocked.

At step 120 the calculated inbound message rate is compared to an authorized message rate number for the particular service provider, which number is stored in a service provider record in data bases 45 within mediated access SCP 26'. In the main, there are three possible paths that may be taken as a result of the relationship between the inbound message rate and the authorized message rate number. If the inbound message rate is excessive by the criteria established, YES branch 121 is taken to routine 122 at which a message notifying service provider SCP 47 is transmitted back across interface 48 by the mediated access SCP. This allows the service provider SCP to take any appropriate action that it is capable of taking when the rate at which it is transmitting messages across interface 48 is greater than it has indicated will be used.

From here, the routine proceeds to decisional step 125 at which the extent to which the inbound message rate exceeds the authorized message rate is checked. If the inbound message rate exceeds the authorized message rate number by at least a predetermined amount, such that the ability of the network to provide adequate and timely service to other service providers will be impaired, the mediation process will terminate message travel across the physical port and block interface 48. If this option is required, YES branch 126 will be taken from step 125. If, on the other hand, the inbound message rate is too high, but not so excessive as to seriously deteriorate network performance, NO branch 127 will be taken from step 125.

Consider first the circumstances in which the inbound message rate exceeds the authorized message rate number by at least the above referenced predetermined amount. The mediation logic advances to step 128 at which a termination message is sent to STP 20'. This instructs the STP to terminate inbound traffic across interface 48 and thus, block the physical port represented thereby. Next, step 129 is reached at which the SCP notifies the service management system 37

(FIG. 1) of the termination of access at the port 48 of SS7 data link 46. This gives personnel at the service management system an opportunity to contact the service provider whose access is being cut off to see if corrective action can be taken. Additionally, it will notify the service management system of the termination in anticipation of possible complaints from customers of this particular service provider.

The routine represented by step 130 is activation of a default application that has been described hereinabove in connection with FIG. 2. From the previous description of the pattern of passing packet messages back and forth in the embodiment of FIG. 2, it will be appreciated that part of the default application is to terminate the process of sending packets from SCP 26' to SS7 data link 46 in response to packets originated within one of central offices 15. Therefore, rather than performing the normal mediation functions and then passing the packet on to service provider SCP 47, the mediated SCP 26' must make a decision as to what response the default application will give to the received packet that would normally be sent to service provider SCP 47. It should thus be understood that once this state is entered, the particular packets transmitted outbound by mediated access SCP 26' in response to packets ultimately intended for service provider SCP 47 will be modified in accordance with the default application running on SCP 26', and that this condition will prevail until the blocking of the interface 48 is cleared. Therefore, it should be understood that part of the tests employed at step 120 is to determine whether interface 48 has already been blocked. If that is the case, it would be wasteful to continue to issue termination instructions.

Once the default application has been activated, the mediation logic is exited at node 131 until the next packet is received.

Next, the situation in which NO branch 127 is taken from step 125 should be considered. First, decisional step 132 is executed at which criteria for rejecting the message are examined. The criteria include the extent to which the inbound message rate exceeds the authorized message rate number, and the nature of the message itself. With respect to the latter consideration, the message may be one that, if simply rejected and not sent to its addressed destination, could leave a customer's phone locked in a state in which it cannot provide service. There are other criteria upon which the decision at step 132 can be based. On the assumption that the message is not rejected, NO branch 135 is taken that returns the logic to the main flow of mediation steps.

If the message is to be rejected, YES branch 136 is taken from step 132 that leads to routine 137. At this step, a rejection message is transmitted to the sender, in the example under consideration, service provider SCP 47. Since the rejection of the message may have an adverse impact on operation of another network element, particularly an SSP at a central office switch, a determination is made at step 138 as to whether an error message should be generated as a result of having rejected the message from the service provider. If this is deemed appropriate, YES branch 139 is taken to step 140 at which an error message is sent to the switching service point that sent an original message to which SCP 47 was attempting to respond. From here, the mediation process is exited at node 141. Naturally, if no error message is required, NO branch 142 is taken from step 138 that leads directly to exit node 141.

The discussion of the steps between branch 121 and node 141 has been based on the assumption that the mediation logic detected an excessive inbound message rate at step 120. The circumstance in which no such excessive message rate is detected should now be considered. When this occurs, NO branch 145 is taken from step 120 to another decisional step 146 at which the message parameters are tested to determine if they are within predetermined valid ranges for AIN messages. If any are out of range, and NO branch 147 is taken to step 148 at which an error message is transmitted to the sender indicting that an out of range parameter was detected. This could be from a logical error that occurred at service provider SCP 47, or an error event that changed too many bits to be detected by the check sums, and which caused the bits of a message parameter to be changed to take the parameter out of range. Once the error message has been sent to the sender of the packet, control moves to a node 149 labeled B, which logically connects to input node 149' that leads control to step 138. Note than an error message is provided to the sender at step 148. Flow then goes to step 138 at which a decision is made as to whether an error message to the SSP is needed and appropriate action is taken as described hereinabove.

If all of the message parameters are in range YES branch 150 is taken from step 146 and the sender/customer pair is checked at step 151. At step 151 the packet is checked for its substantive message content to determine if it includes a message to alter call processing for an affected customer directory number. If this is the case, an affected customer identifier from the packet is detected and used to access a customer record in data bases 45. Within this record is an indication of the service providers for whom this LEC customer is also a customer of the service provider. In other words, the data base contains an indication that this particular customer has authorized the particular service provider to alter the call progress of a telephone call made on the customer's directory number. If the customer record indicates that there is a relationship between the customer identified by the affected customer identifier and the service provider who is the sender of the message, then YES branch 155 is taken. If there is no sender/customer pair in data bases 45, NO branch 156 is taken. This leads to node 160 that, in turn, takes the logical flow to step 137 at which a rejection message is sent to the sender. The routine of checking for whether an SSP error message is needed is again followed and the mediation process is exited at 141.

If an appropriate sender/customer pair is detected in the customer record of the data base, YES branch 155 is taken to decisional step 157 where the sender identifier is compared to the logical entity that is designated as the recipient in the message. At step 157, the definition of the recipient should be considered to include both the network element to which the message is addressed combined with certain aspects of the substantive command of the message. In other words, it may be appropriate for this particular sender to communicate with certain network elements to perform some functions, but not all of the possible repertoire of functions for which that element will accept a command. For example, it may be acceptable for a service provider to communicate with billing records contained with the AIN to increment a value for fees for services provided by this particular service provider. However, it may not be acceptable for the same service provider to affect the customer's records with respect to LEC billing.

If the sender/recipient pair is invalid, NO branch 158 is taken, which once again leads to step 137 and its subsequent steps for sending a rejection message and determining whether an error message needs to be sent to an SSP.

If the sender/recipient pair is legal, YES branch 159 is taken to step 161 at which a feature interaction table is checked. In this routine, certain activated features, which may interact with a feature being implemented by the message that is under scrutiny, are checked to determine if an undesirable feature interaction, such as a trigger loop, may be presented. The routines for checking feature interactions are relatively complex, but feature interaction detection algorithms exist in the art. Once this routine has been performed, the results of the analysis are tested at step 162 to determine if an illegal interaction was detected. If it is determined that an illegal or dangerous interaction is present, YES branch 165 is taken that also leads to node 160 and step 137. If no illegal interaction is detected, NO branch 166 is taken to step 167 at which the message is forwarded to its recipient. After this, branch 168 takes the mediation process to exit node 141 and the SCP 26' prepares to receive the next packet.

FIG. 7 shows the mediation functions performed at the signal transfer point 20' in the embodiment of FIG. 2. When a packet is received by STP 20' across interface 48, the mediation process is entered at node C, which bears reference number 169. While not specifically shown, the sender is identified in the same manner as it is with respect to step 118 shown in FIG. 6. At step 170 the sender identifier contained within the message is compared to a port identifier stored within STP 20' that designates an authorized provider of packets to interface 48. In other words, it stores a record of the association of the physical port of interface 48 with the particular service provider that is authorized to operate an SCP on SS7 data link 46. If these do not match, it is inappropriate for the gateway screening to allow a packet into the network that represents itself to have been originated from one entity, yet should not have been generated by that entity because of the port through which it is trying to enter the AIN. Therefore, NO branch 171 is taken to step 172 at which the message is rejected. A rejection message is transmitted to the sender at step 175 and the routine is then exited at exit node 176.

If the sender and port match, YES branch 177 is taken from step 170 to decisional step 178 at which the destination address is tested against the identity of the sender. If the destination address is for a network element with which the service provider SCP 47 is not allowed to communicate, NO branch 179 is taken to rejection step 172. The system behaves in the same manner as it did when branch 171 was taken from this point. If the destination address is acceptable, YES branch 180 is taken from step 178. A check for any alternate routing necessary is made at step 181. This is simply a process for determining whether certain switching nodes within the network are down and alternate address routing needs to be employed. Upon completion of this task, the message is forwarded to the recipient at step 182 and mediation is exited at node 176.

The division of mediation tasks for the embodiment of FIG. 3 is different than the embodiment of FIG. 2, although the overall resulting functionality is the same. Since the functions involved are quite similar, the detail for each step that was recited in connection with FIGS. 6 and 7 will not necessarily be repeated for similar steps in FIGS. 8 and 9. FIG. 8 is a flow control diagram of the mediation steps performed by screening logic 50 of service switching point 49 shown in FIG. 3. It should be remembered that packets travel across interface 41 in a known format for ISDN packets. Upon receipt of a packet, the mediation logic is entered at node D 185. First, appropriate check sum tests are made at step 186. These are made in accordance with the rules in use for the ISDN protocol that is employed across interface 41. If the check sums indicate an error, branch 187 is taken to routine 188 at which an error message is sent to service node 39'. As noted on FIG. 8, this is also communicating in accordance with the ISDN protocol in use. From here, the need for an error message to an SSP is determined at step 189 and, if needed, such a message is sent at step 190. The logic of this sequence of steps is the same as that associated with steps 138 and 140 shown in FIG. 6. The mediation logic is then exited at node 191.

If the check sums are acceptable, branch 192 is taken from step 186 and the sender is identified at step 195 in a manner analogous to the performance of step 118 shown in FIG. 6. The match between the sender and the particular ISDN port from interface 41 upon which the packet was received is tested at step 196. If they do not match, NO branch 197 is taken to routine 198 at which the absence of a match is noted, logged, and a message sent to the service management system indicating that a packet was received showing an incorrect or inappropriate sender. Since it is considered more likely that a service node may be operated by a third party service provider who in turn allows other service party providers to operate on such a node, it is believed preferable to provide for termination of message transport across the particular ISDN port if a message with an incorrect sender identifier is received. This decision is made at step 199. If the port is not to be terminated, NO branch 210 is taken that leads back to step 188. If the transport of messages inbound from this port is to be terminated, YES branch 211 is taken that leads to routine 212 at which the screening logic 50 terminates message flow across the particular ISDN port 41 upon which the message containing the sender/port mismatch was received. It should be noted that this step may physically disconnect an ISDN link, or terminate use of a logical link such as the output of a multiplexer that corresponds to one basic rate or primary rate interface.

At step 215, service management system is notified of the termination and a default application is activated at step 216. The default application may be implemented in SSP 49. However, the default application will normally be activated by sending a message to mediated access SCP 26' indicating that the default application for this particular service provider should be employed. The mediated access SCP 26' will control the default application and send appropriate messages back to SSP switches in response to messages that, prior to termination of the port, would have been directed to service node 39' for response.

Returning now to the test of whether the sender matches the physical port at 196, assume the match is favorable and YES branch 217 is taken. This leads to step 218 that increments message counts and calculates the input message rate as described hereinabove. Comparison of the input message rate to the authorized message rate number is achieved at step 219 in the same manner as that associated with step 120 in FIG. 6. If the rate is too high, YES branch 220 is taken to step 221 at which the occurrence of the over rate condition is logged and the service management system is notified. Next, the criteria for blocking the port are checked at step 222. If they are met, YES branch 225 is taken, which leads to step 212. Thus, the SSP responds in the same manner as it previously did if the decision to terminate the port is made at step 199. If the port is not to be terminated, NO branch 226 is taken and the mediation process continues.

At step 227 the sender/recipient combination is compared to a legal list. If it is unacceptable, NO branch 228 is taken to node E at 229. This takes control to node E at 229' at which an error message is sent to the service node and the subsequent steps are executed.

If the sender/recipient pair is legal, YES branch 230 is taken and the mediation process is complete. A packet in signaling system 7 format is generated from the ISDN packet at step 231 and the SS7 packet is forwarded to signal transfer point 20 at step 232, for subsequent transmission to its destination address. The mediation logic is then exited at step 235 and the process is complete.

From review of FIG. 8 it should be noted that one of the characteristics of the mediation that takes place within screening logic 50 is testing the validity of the message as a function of the port upon which it is received so that early detection of an illegal attempt to communicate with a particular recipient is possible. The more data intensive mediation functions (other than network usage issues) are performed at the mediated access service control point 26'. The mediation steps performed at the SCP in the embodiment of FIG. 3 are illustrated in FIG. 9. When a packet arrives at mediated SCP 26', node F at 235 is the entry point. The check sums are tested at step 236 as described hereinabove. A negative result leads to branch 237 which takes flow to step 238 at which the message is rejected and the mediation process is exited at 239. Step 240 indicates that any password checking or decryption of a message is preferably performed at mediated access SCP 26'. Such is not required, but may be preferable due to the relative ease of access to ISDN links as compared to SS7 links.

Once again, the sender indicated by the sender identifier of the message is detected at step 241 and the appropriate message counts and the like are incremented and updated at step 242. At step 245, the calculated message rate is compared to the authorized message rate number. If acceptable, NO branch 246 is taken to step 247 at which the message parameters are tested for being within valid ranges. If any parameter is out of range, NO branch 248 is taken to routine 249 at which an error message is transmitted to the sender and flow travels to node G at 250. This takes the program to a node bearing the same label at 250', which leads to step 251 at which the need for an error message is tested in the same manner as it was at step 138 in FIG. 6. Similarly, if an error message is needed, it is generated at step 252 and the mediation routine is exited at 255.

If the message parameters are in range, YES branch 256 is taken to step 257 at which the sender/customer pair is compared as previously described. If an unfavorable result is obtained, NO branch 258 is taken that leads to routine 259 at which a rejection message is transmitted to the sender, i.e., service node 39'. The testing for an error message to the SSP is then performed at step 251 and the mediation program continues to its exit at 255. If the customer data base indicates that the sender is authorized to affect calls of this customer, YES branch 260 is taken from step 257 and the feature interaction table is consulted at 261. The test for an illegal interaction is performed at step 262 and, if none is present, branch 265 is taken to routine 266 at which the message is forwarded to its recipient. Again, if an illegal interaction is detected at 262, YES branch 267 is taken to step 259 at which the by now familiar sequence of rejection message and error message processing is performed.

The only alternative not yet considered in this embodiment is if too many messages are detected. This is handled in the same manner as previously described by YES branch 270 being taken from step 245 to step 271 at which the sender and the service management system are notified. The need to reject the message is tested at 271. If it is to be rejected, YES branch 272 is taken to step 259. If not, NO branch 275 takes the logic to branch 246 at which the mediation continues.

From the foregoing description, it will be appreciated that the various embodiments of the present invention meet the objects stated above for protecting the operation of the public switched telephone network controlled by the Advanced Intelligent Network when access to the AIN is opened to multiple service providers. It addresses the problems and potential problems described in the Background of the Invention. From the foregoing description of alternate embodiments of the present invention, other embodiments will suggest themselves to those skilled in the art. Therefore, the present invention should be limited only by the claims below and equivalents thereof.

What is claimed is:

1. A method of mediating traffic in packet messages in an intelligent switched telephone network that includes a plurality of digital data communications channels between a plurality of central offices and at least one signal transfer point, and an interface to a service provider service control point, said interface being connected to said signal transfer point, comprising the steps of:

providing at least one mediated service control point that is connected to said signal transfer point, said mediated service control point including at least one data base containing customer records;

detecting a sender identifier in each in-bound packet from said interface;

comparing said sender identifier with a port identifier that designates an authorized provider of packets to said interface;

rejecting each said in-bound packet for which said sender identifier fails to correspond to port identifier;

detecting an affected customer identifier in each said in-bound packet from said interface that includes a message to alter call processing for an affected customer directory number;

reading a particular one of said customer records in said data base that contains data for a directory number corresponding to said affected customer identifier and determining whether a sender corresponding to said sender identifier is authorized to alter calls involving said directory number; and rejecting said in-bound packet if said sender corresponding to said sender identifier is not authorized to alter calls involving said directory number.

2. A method of mediating traffic in packet messages as recited in claim 1 further comprising the steps of:
   detecting a destination address for each said in-bound packet from said interface; and
   rejecting each said in-bound packet for which said destination address is for a network element with which said service provider service control point is not allowed to communicate.

3. A method of mediating traffic in packet messages in an intelligent switched telephone network that includes a plurality of digital data communications channels between a plurality of central offices and at least one signal transfer point, and an interface to a service provider source of said packet messages, comprising the steps of:
   providing at least one mediated service control point, said mediated service control point including at least one data base containing service provider records, said service provider records containing an authorized message rate number for at least a service provider associated with said service provider source of said packet messages;
   determining an inbound message rate at which said packet messages are provided across said interface from said service provider source of said packet messages;
   determining whether said inbound message rate exceeds said authorized message rate number by at least a predetermined amount;
   if said inbound message rate exceeds said authorized message rate number by at least said predetermined amount:
      blocking said packet messages from said service provider source of said packet messages, and
      causing said mediated service control point to subsequently send messages effecting a default application in response to network messages addressed to said service provider source of said packet messages.

4. A method of mediating traffic in packet messages in an intelligent switched telephone network that includes a plurality of digital data communications channels between a plurality of central offices and at least one signal transfer point, and an interface to a service provider service control point, said interface being connected to said signal transfer point, comprising the steps of:
   providing at least one mediated service control point that is connected to said signal transfer point, said mediated service control point including at least one data base containing service provider records, said service provider records containing an authorized message rate number for at least a service provider associated with said service provider service control point;
   determining an inbound message rate at which said packet messages are provided across said interface from said service provider service control point;
   determining whether said inbound message rate exceeds said authorized message rate number by at least a predetermined amount;
   if said inbound message rate exceeds said authorized message rate number by at least said predetermined amount:
      sending a message from said mediated service control point to said signal transfer point for causing said signal transfer point to block said packet messages from said service provider service control point, and
      causing said mediated service control point to subsequently send messages effecting a default application in response to network messages addressed to said service provider service control point.

5. A method of mediating traffic in packet messages as recited in claim 4 wherein said message from said mediated service control point to said signal transfer point for causing said signal transfer point to block said packet messages from said service provider service control point also causes said signal transfer point to subsequently redirect said network messages addressed to said service provider service control point to said mediated service control point.

6. A method of mediating traffic in packet messages in an intelligent switched telephone network that includes a plurality of digital data communications channels between a plurality of central offices and at least one signal transfer point, and an interface between a service node and a service switching point at one of said plurality of central offices comprising the steps of:
   providing at least one mediated service control point that is connected to said signal transfer point, said mediated service control point including at least one data base containing customer records;
   detecting a sender identifier in each in-bound packet from said interface;
   comparing said sender identifier with a port identifier that designates an authorized provider of packets to said interface;
   rejecting each said in-bound packet for which said sender identifier fails to correspond to port identifier;
   detecting an affected customer identifier in each said in-bound packet from said interface that includes a message to alter call processing for an affected customer directory number;
   reading a particular one of said customer records in said data base that contains data for a directory number corresponding to said affected customer identifier and determining whether a sender corresponding to said sender identifier is authorized to alter calls involving said directory number; and
   rejecting said in-bound packet if said sender corresponding to said sender identifier is not authorized to alter calls involving said directory number.

7. A method of mediating traffic in packet messages as recited in claim 6 further comprising the steps of:
   detecting a destination address for each said in-bound packet from said interface; and
   rejecting each said in-bound packet for which said destination address is for a network element with which said service node is not allowed to communicate.

8. A method of mediating traffic in packet messages in an intelligent switched telephone network that includes a plurality of digital data communications channels between a plurality of central offices and at least one signal transfer point, an interface between a service node and a service switching point associated with one of said plurality of central offices, said service switching point being connected to said signal transfer point, comprising the steps of:
   providing at least one mediated service control point that is connected to said signal transfer point, said mediated service control point including at least one data base containing service provider records, said service provider records containing an authorized message rate number for at least a service provider associated with said service node;

determining an inbound message rate at which said packet messages are provided across said interface from said service node;

determining whether said inbound message rate exceeds said authorized message rate number by at least a predetermined amount;

if said inbound message rate exceeds said authorized message rate number by at least said predetermined amount:

causing said service switching point to block said packet messages from said service node, and causing said mediated service control point to subsequently send messages effecting a default application in response to network messages addressed to said service node.

9. A method of mediating traffic in packet messages as recited in claim 8 wherein said signal transfer point subsequently redirects said network messages addressed to said service node to said mediated service control point if said inbound message rate exceeds said authorized message rate number by at least said predetermined amount.

* * * * *